Sept. 4, 1928.

L. F. MOODY 1,683,567

HYDRAULIC TURBINE

Original Filed June 25, 1924

Inventor
Lewis F. Moody
By his Attorney
Edwards, Sager and Bower

Patented Sept. 4, 1928.

1,683,567

UNITED STATES PATENT OFFICE.

LEWIS FERRY MOODY, OF PHILADELPHIA, PENNSYLVANIA.

HYDRAULIC TURBINE.

Original application filed June 25, 1924, Serial No. 722,228. Divided and this application filed November 24, 1925. Serial No. 71,074.

This invention relates to hydraulic turbines and particularly to turbines of relatively high specific speed.

One object of the invention is to provide such a turbine in which the construction and operation will be simplified and cheapened by dispensing with the usual wicket gates and replacing them by a simple, sliding cylinder gate to control the flow with a transition space intervening between the gate and the entrance edges of the runner blades in order to insure steady, smooth and efficient action of the runner.

Another object of the invention is to provide a special, compound form of runner particularly adapted to cooperate with such a means of control. This case is a division of my copending application, Serial No. 722,228, filed June 25, 1924.

A further object of the invention is to provide means for admitting air to the region behind the gate when in intermediate position.

In the accompanying drawings illustrating the invention

Figure 1:
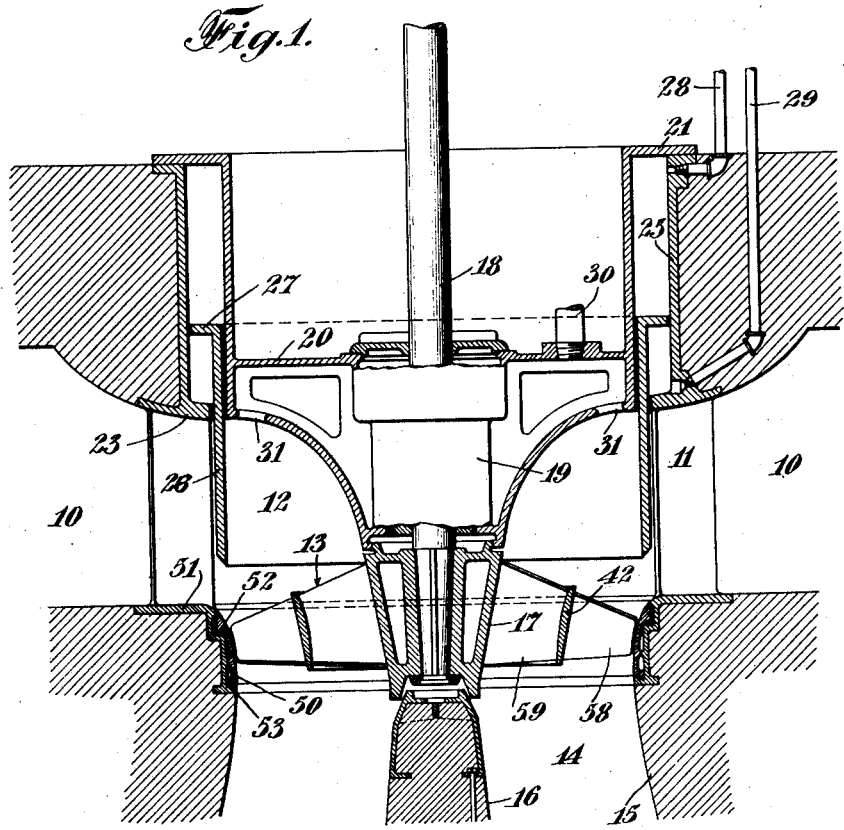
Fig. 1 is a vertical sectional view of the turbine showing a means of actuating the gate by fluid pressure.

In the embodiment of the invention shown in Fig. 1 water enters from the casing 10 and passes through the guide vanes 11 which give it a combined radial and tangential motion with respect to the turbine axis. It then passes through the transition space 12 which turns the radial components into an approximately axial direction and directs the water against a high-speed, peripherally unshrouded, propeller-type runner 13. The water is discharged from the runner in a direction chiefly axial and with tangential components of reduced amount and enters the draft tube 14, which is preferably of the annular form shown, comprising the outer wall 15 and inner core 16. The runner 13 contains the hub 17 keyed to the vertical shaft 18 which is laterally supported by the guide bearing 19. The bearing 19 is carried within the head cover 20 which is connected by the flange 21 with the pit liner 25 extending upward from the speed ring having vanes 11.

A casing 51 surrounds the runner blades and forms the base for the stay vanes 11 and liner 25. The casting 51 contains a removable and renewable liner 50 adjacent to the runner blade tips. This liner can be either in a single casting or in two or more sections and is held in place by suitable bolting. The lower ring 51 of the speed ring has the liner fitted to it by machining, the ring 51 being provided with annular shoulders 52, 53 supporting the liner 50 and permitting it to be removed upward. As shown the liner integrally carries the seat ring for the cylinder gate 26, but this seat may be separate where desired. When turbines of the propeller type are applied to fairly high heads, such a liner is advantageous in case corrosion develops in the casing surrounding the runner due to eddies formed adjacent to the runner blades, and the liner will have a further advantage of being renewable in case foreign material becomes lodged in the clearance space outside the runner blades and scores the surface of the wall.

The cylinder gate 26 slides between the upper distributor ring 23 and the head cover 20 and is actuated by the piston flange 27 sliding within the pit liner 25 which, with the head cover 20, forms an annular cylinder. Fluid pressure may be admitted or exhausted under control of the turbine governor through pipes 28 and 29 to lower or raise the cylinder gate 26 and thus to regulate the flow through the turbine and thereby to control its load and speed.

With the cylinder gate 26 in fully opened position, the flow entering through the intake 10 and combined guide and stay vanes 11 passes with combined radial and tangential components into the transition space 12 where it is turned downward toward the axial direction and on to the runner 13. In this transition space the streams from the passages between the vanes 11 are gathered together into a continuous rotating mass before being directed against the runner. At intermediate positions of the cylinder gate 26, the upper, inner portion of the flow will be partially cut off so that at partgate the flow will be delivered mainly at the outer ends of the runner blades.

When desired, air may be admitted to the inner portion of the transition space 12 so that the annular stream entering the transition space at partgate positions of the cylinder gate 26 will have an inner free surface within which the space 12 is free from the flow by the admission of air. The space behind the cylinder gate which would otherwise be occupied by water in a more or less eddying and turbulent condition will be replaced by air, and the loss of energy in such eddies will be reduced or avoided. At the same time the internal circulation within the runner occurring at partgate involving an upward flow near the hub and a return flow through the outer portions of the blades will be reduced. The air admitted through the pipe 30 which may be fitted with suitable valve or control means passes through the ports 31 into the transition space.

The cylinder gate 26 is advantageous in being subject to but little hydraulic load and requiring little power to operate it, the governor power being required chiefly to overcome the friction of the gate. The gate mechanism is, in the arrangement shown, reduced to a single moving part of rugged construction and simple arrangement. This form of turbine is therefore simple and durable and relatively inexpensive, and is particularly suited to installations of small or moderate size under low or moderate heads.

The transition space and runner are of such form and so arranged with relation to the cylinder gate that the runner blades do not pass immediately through the region of turbulence behind the gate when in partgate position. Sufficient space is provided for the water to form a smoothly flowing, continuous body of water by the time it encounters the runner blades with but little turbulence then remaining, thus avoiding unsteadiness of operation of the runner or corrosive effects on the runner blades.

A turbine of this form is well adapted to installations operating under relatively steady loads and where very high partgate efficiency is not important. An enclosed intake passage or casing 10 may be used as shown, this casing being preferably of volute form, or when desired, the turbine can be arranged for an open flume setting.

The runner 13 is of a special compound type comprising two concentric series of vanes or blades including an outer series 58 and an inner one 59, the two series being separated by an intermediate ring or partition 42 conforming to the flow lines through the runner. The outer series of blades 58 contains a different number of blades from the inner series 59 within the partition 42. In this case four blades or vanes 59 are used in the inner series, this number being sufficient to provide proper guidance for the flow through the central portion of the runner, and six unshrouded blades 58 are used in the outer series where the circumferential distance around the runner is greater. Thus the partition ring connects the vanes together at an intermediate point between the hub and the tips. This ring thus carries on its exterior the series of unshrouded blades 58 having no further connection at their tips. This partition increases the mechanical strength of the runner by interconnecting all of the blades and is placed at such a radial position between the tips and hub that it provides both maximum mechanical strength and at the same time has a lower linear velocity through the water than it would have if placed at the outer tips of the blades. This reduced linear velocity correspondingly reduces the hydraulic surface losses due to the dragging of the ring through the water, since the water in contact with this ring has a lower relative velocity against the ring than would occur if the ring were located at the blade tips. The ring is also advantageous under partgate conditions of operation, for when the gate is in such position, the ring or partition will serve to guide the flow and to reduce the wasteful internal circulation of water within the runner.

Figure 2:
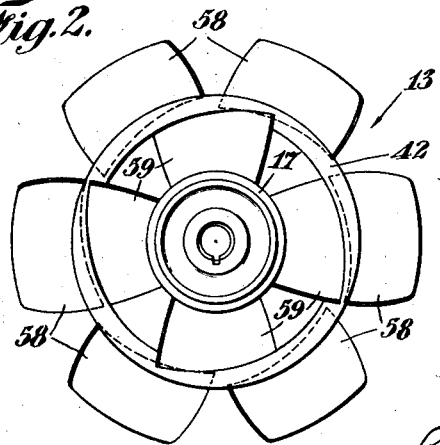
Fig. 2 is a plan view of the runner.

The compound form runner furnishes a useful construction for the intermediate range of specific speeds between the high speed Francis or mixed-flow form of runner having an outer band or shroud ring and the unshrouded propeller type runners of still higher specific speed. On account of the added strength furnished by the partition ring, the inner series of blades can be made thinner or shorter or fewer in number than would be necessary in a simple unshrouded runner, and this can be accomplished without incurring the hydraulic losses due to an outer band or shroud. This compound form of runner is capable of securing increased partgate efficiencies as well as high maximum efficiencies in runners of moderately high specific speeds. In either or both series of blades an axial opening may be provided between the blade edges as shown by Fig. 2. That is, if the area of each blade of a series is projected on to a plane normal to the runner axis it would, if superimposed on the area of the annular opening between the partition ring and curb ring, or between the hub and partition ring, projected on to said plane, leave a portion of said latter area uncovered.

This application is a division of my original application Serial Number 722,228, filed June 25, 1924.

I claim:—

1. In combination with a hydraulic turbine having an intake and discharge, of a propeller type runner comprising an inner series of vanes, a partition ring connecting the ends of said vanes, and an outer series of unshrouded vanes extending outwardly from said partition ring, the outer portion of said unshrouded vanes being more nearly horizontal than vertical and the outer series of vanes being greater in number than the inner series of vanes.

2. In combination with a hydraulic turbine having an intake and discharge, of a propeller type runner comprising an inner series of vanes, a partition ring connecting the ends of said vanes, and an outer series of unshrouded vanes extending outwardly from said partition ring, the outer portion of said unshrouded vanes being more nearly horizontal than vertical and one of said series having a greater number of vanes than the other.

3. In combination with a hydraulic turbine having an intake and discharge, of a runner having two concentric annular water passages, each passage containing a series of a relatively small number of vanes, the inner and outer series having projected areas in a plane normal to the runner axis which are less than the areas of their respective annular passages projected in the same plane.

4. In combination with a hydraulic turbine having an intake and discharge, of a runner comprising inner and outer series of vanes, the adjacent edges of each series of vanes being spaced to provide axial openings.

5. In combination with a hydraulic turbine having an intake and discharge, of a runner having a series of a relatively small number of vanes and a shroud ring connecting the ends thereof, the area of said vanes projected on to a plane normal to the runner axis being less than the projected area of the annular passage within said shroud ring.

6. In combination with a hydraulic turbine having an intake and discharge, of a runner having an annular water passage containing a series of vanes, a shroud ring connecting the ends of said vanes, and the adjacent edges of said vanes being spaced to form an axial opening through said annular passage.

7. In combination with a hydraulic turbine having an intake and discharge, of a runner having a series of vanes, the ends of which are connected by a shroud ring, the projected area of said vanes on to a plane normal to the runner axis being less than the area of the annular passage within said shroud ring, the lower edge of said ring extending to the lower edge of each vane.

8. In combination with a hydraulic turbine having an intake and discharge, of a runner having an annular water passage containing a series of vanes, and a shroud ring connecting the ends of said vanes, the adjacent edges of said vanes being spaced to form an axial opening through said annular passage, the upper edge of said shroud ring terminating adjacent the upper edge of said vanes.

9. In combination with a hydraulic turbine having an intake and discharge, of a runner having an annular water passage containing a series of vanes, and a shroud ring connecting the ends of said vanes, the adjacent edges of said vanes being spaced to form an axial opening through said annular passage, the upper and lower edges of said shroud ring terminating adjacent the upper and lower edges of said vanes.

10. In combination with a hydraulic turbine having an intake and discharge, of a runner of the propeller type having an annular passage with a series of vanes therein, a shroud ring connecting said vanes, and an outer series of vanes extending outwardly from said shroud ring and having a different number of vanes from that in said other series, the upper and lower edges of said ring terminating adjacent the upper and lower edges of said vanes.

11. In combination with a hydraulic turbine having an intake and discharge, of a runner of the propeller type having an annular passage and a series of vanes disposed therein, a shroud ring connecting said vanes, and an outer series of vanes extending outwardly from said shroud ring and having a different number of vanes from that in said other series, said ring being provided with an approximately straight outer surface in meridian section.

12. In combination with a hydraulic turbine having an intake and discharge, of a runner of the propeller type having an annular passage and a series of vanes disposed therein, a shroud ring connecting the ends of said vanes, and an outer series of vanes of greater number than said other series the upper and lower edges of said ring terminating adjacent the upper and lower edges of said vanes and said ring being inclined to the runner axis.

13. In combination with a hydraulic turbine having an intake and discharge, of a runner of the propeller type having an annular passage and a series of vanes disposed therein, a shroud ring connecting the ends of said vanes, and an outer series of vanes of greater number than said other series the upper and lower edges of said ring terminating adjacent the upper and lower edges of said vanes, said ring having a curved inner surface.

14. In combination with a hydraulic turbine having an intake and discharge, of a runner of the propeller type having an annular passage and a series of veins disposed therein, a shroud ring connecting the ends of said vanes, and an outer series of vanes of greater number than said other series the upper and lower edges of said ring terminating adjacent the upper and lower edges of said vanes, said ring being provided with an approximately straight outer surface in meridian section.

15. In combination with a hydraulic turbine having an intake and discharge, of a runner of the propeller type having an inner and outer series of blades, and a partition ring separating the same, certain of the inner blades being offset from the outer blades.

16. In combination with a hydraulic turbine having an intake and discharge, of a propeller type runner having an inner and outer series of vanes, and a partition ring between said series, the outer series being more horizontal than vertical at the blade tips, supported entirely by said ring, and certain of the inner vanes being offset from the outer vanes.

17. In combination with a propeller type hydraulic turbine having an intake and discharge, of a runner comprising an inner and outer series of vanes, said outer vanes being more horizontal than vertical at the blade tips, a partition ring for separating said series, certain of the inner vanes being offset from the outer vanes, while certain other of the inner vanes are substantially in alignment with certain of the outer vanes.

18. In a hydraulic turbine, the combination with a runner having an inner and outer series of vanes, certain of the vanes in each series being spaced to provide axial spaces therebetween, and a partition ring for separating said series, of an intake for the flow to said runner, and means for forming a transition space between said intake and runner.

19. In a hydraulic turbine, the combination with a propeller type runner having an inner and outer series of vanes, said outer series of vanes being more horizontal than vertical at the blade tips, a partition ring separating said series one of which has a greater number of vanes than the other, of an intake for the flow to said runner, and means for directing an axial flow from said intake to said runner.

20. In a hydraulic turbine, the combination with a propeller type runner having an inner and outer series of vanes, said outer series of vanes being more horizontal than vertical at the blade tips, a partition ring separating said series one of which has a greater number of vanes than the other, of an intake for the flow to said runner, and stay vanes between said intake and runner, thereby to impart a whirling motion to the turbine flow.

21. In a hydraulic turbine, the combination with a runner having an inner and outer series of vanes, a partition ring separating said series one of which has a greater number of vanes than the other, of an intake for the flow to said runner, stay vanes between said intake and runner, and gate mechanism disposed within said vanes for controlling flow to said runner.

22. In a hydraulic turbine, the combination with a propeller type runner having an inner and outer series of vanes, a partition ring separating said series, one of which has a greater number of vanes than the other, of an intake for the flow to said runner, stay vanes between said intake and runner adapted to impart a whirling motion to the turbine flow, and gate mechanism operable at part-gate to allow flow to only one of said series of vanes.

23. In a hydraulic turbine, the combination with a propeller type runner having an inner and outer series of vanes, a partition ring separating said series one of which has a greater number of vanes than the other, of an intake for the flow to said runner, stay vanes between said intake and runner adapted to impart a whirling motion to the turbine flow, and gate mechanism operable to allow flow simultaneously to both series of vanes or only to one of said series.

24. In a hydraulic turbine, the combination with a runner having an inner and outer series of vanes, a partition ring separating said series one of which has a greater number of vanes than the other, of an intake for the flow to said runner, stay vanes between said intake and runner adapted to impart a whirling motion to the turbine flow, and gate mechanism operable to allow flow to only the outer series of vanes.

25. In a hydraulic turbine, the combination with a runner having an inner and outer series of vanes, a partition ring separating said series, one of which has a greater number of vanes than the other, of an intake for the flow to said runner, stay vanes between said intake and runner adapted to impart a whirling motion to the turbine flow, gate mechanism operable to allow flow to only the outer series of vanes, and means for supplying air to the inner series of vanes during said latter operation.

26. In a hydraulic turbine, the combination comprising an intake passage turning from a radial to an axial direction, guide vanes in the radial portion thereof for whirling the flow passing therethrough, and an axial flow runner disposed in the axial portion of said passage, and spaced from said guide vanes to form a transition space therebetween, said runner having unshrouded blades with an intermediate partition while the blades on the inner side of said partition are spaced to form an axial opening therebetween.

27. In a hydraulic turbine, the combination comprising an intake passage turning from a radial to an axial direction, guide vanes in the radial portion thereof for whirling the flow passing therethrough, and an axial flow runner disposed in the axial portion of said passage, and spaced from said guide vanes to form a transition space therebetween, said runner having inner and outer series of blades of different number.

28. The combination in a hydraulic turbine comprising means forming an intake and discharge passage the intake portion thereof turning from a radial to an axial direction, and a runner disposed in said passage and having blades provided with an intermediate partition ring to form inner and outer series of blades, said outer series having a different number of blades than the inner series, and guide vanes adapted to impart whirl to the flow through said intake and being common to both series of blades.

LEWIS FERRY MOODY.